United States Patent [19]
Campbell-Miller et al.

[11] Patent Number: 6,055,112
[45] Date of Patent: *Apr. 25, 2000

[54] LENSED CASCADED OPTICAL FILTER

[76] Inventors: Margot Campbell-Miller, 8 Monterey Drive, Nepean, Ontario, Canada, K2H 7A6; Brian S. Kawasaki, 5541 Perrapiece Crescent, Manotick, Ontario, Canada, K4M 1C5; Yihao Cheng, 36 Meadowbreeze Drive, Kanata, Ontario, Canada, K2M 2L6; Nebojsa Galic, 740 Springland Drive, # 434, Ottawa, Ontario, Canada, K1V 6L8; Gary Pomerant, 20 Spruce Street, Ottawa, Ontario, Canada, K1R 6N7

[ * ] Notice: This patent is subject to a terminal disclaimer.

[21] Appl. No.: 09/095,065

[22] Filed: Jun. 10, 1998

[30] Foreign Application Priority Data

Apr. 24, 1998 [CA] Canada ................................. 2235850

[51] Int. Cl.[7] ................................. G02B 3/00; G02B 6/18
[52] U.S. Cl. ........................... 359/652; 359/654; 385/124
[58] Field of Search ..................... 359/652, 653, 359/654; 358/124

[56] References Cited

U.S. PATENT DOCUMENTS

| | | | |
|---|---|---|---|
| 3,829,195 | 8/1974 | Rawson | 350/96 |
| 5,453,827 | 9/1995 | Lee | 356/73.1 |
| 5,539,577 | 7/1996 | Si et al. | 359/629 |
| 5,612,824 | 3/1997 | Si et al. | 359/652 |
| 5,790,314 | 8/1998 | Duck et al. | 359/654 |

*Primary Examiner*—Scott J. Sugarman
*Attorney, Agent, or Firm*—Neil Teitelbaum & Associates

[57] ABSTRACT

A multi-pass optical filter using two identical filters provides narrower band filtering by double filtering an optical signal passing therethrough. Although passing a beam of light at an optical filter having a substantially thick optical thickness is known to have significant coupling losses due to angular misalignment of the output beam and the receiving optical fibre, it has been found that twice filtering in the conventional manner by serially coupling two same filters increases coupling losses. However, this invention provides a coupling arrangement wherein losses are significantly lessened by offsetting the axes of the lensed filters such that the beam exiting the first filter couples into the second filter as it would be reflected backward into the first filter.

14 Claims, 7 Drawing Sheets

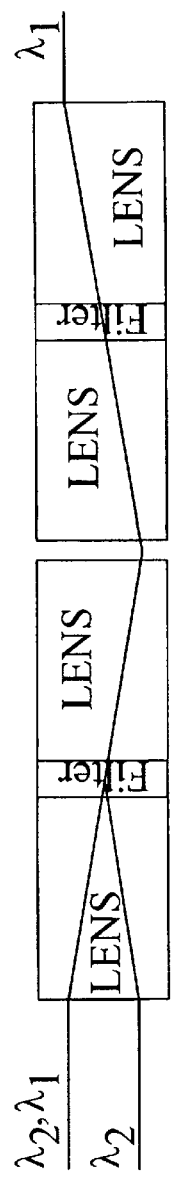
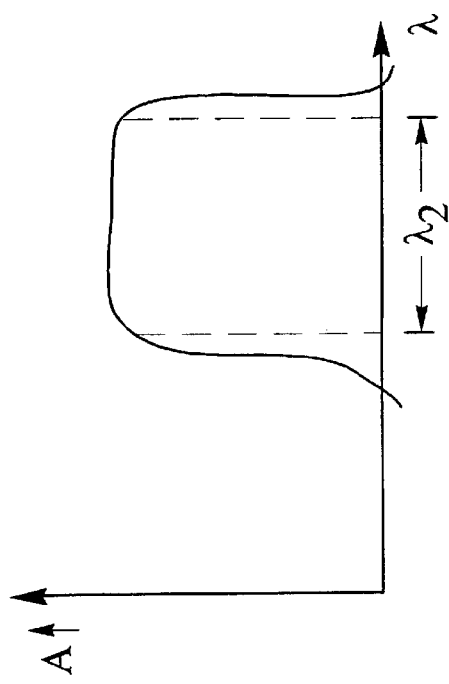
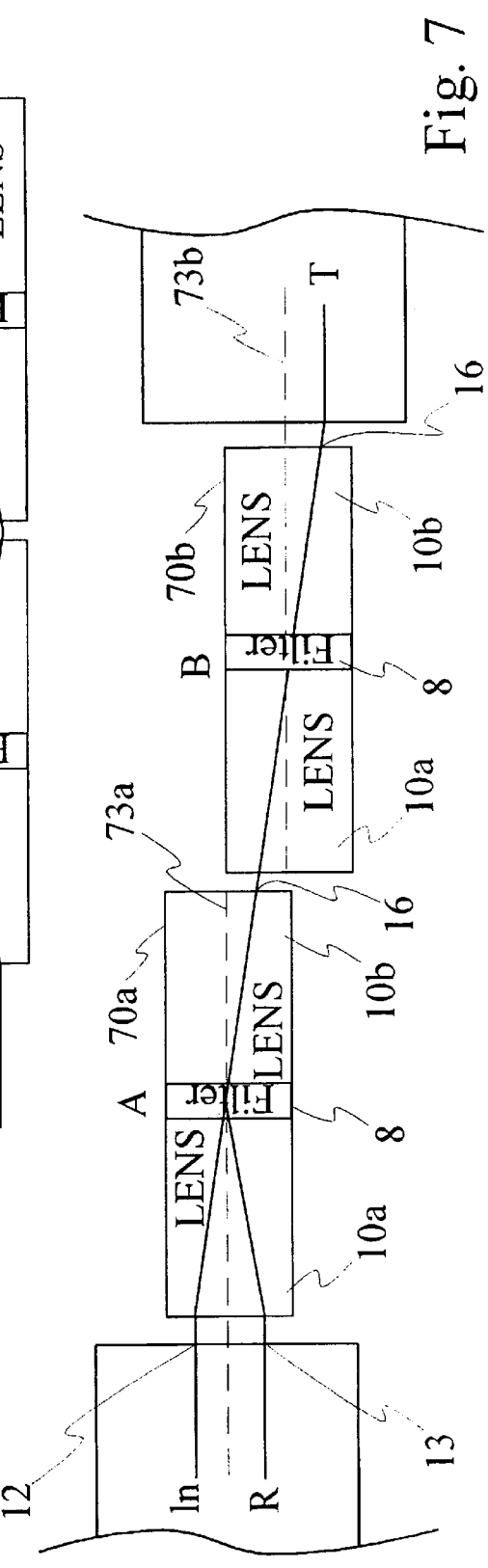

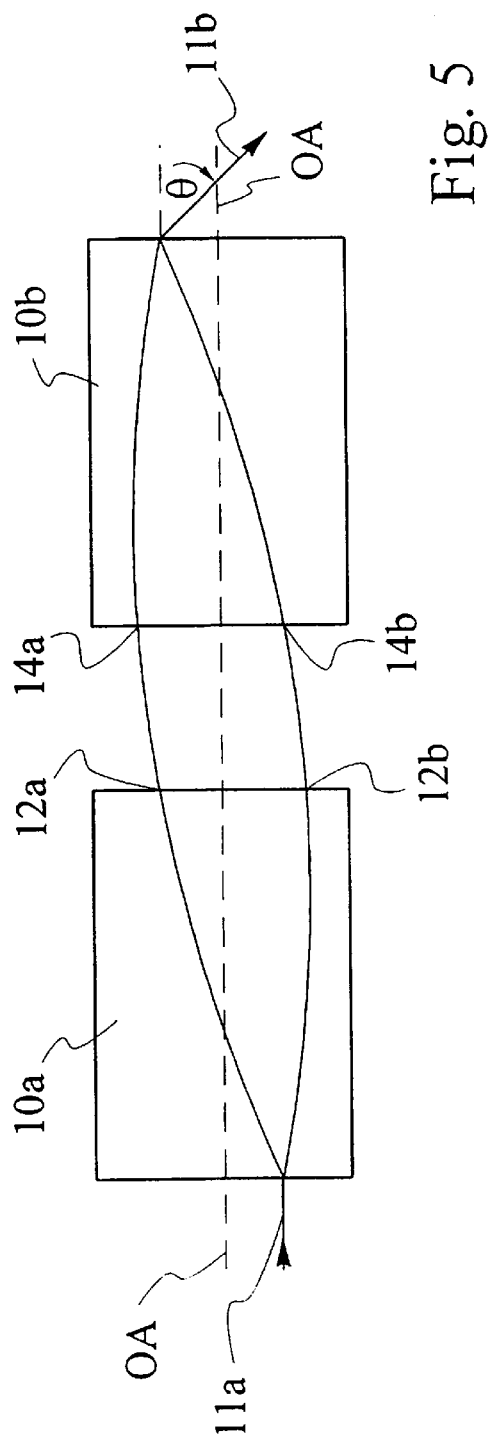
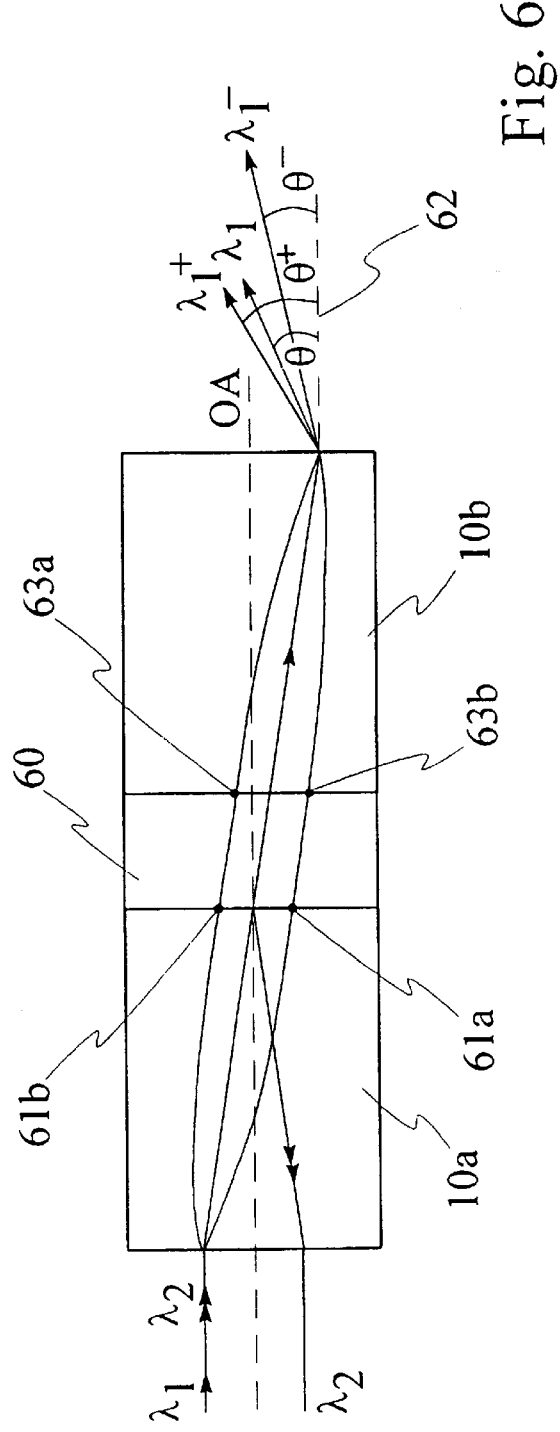

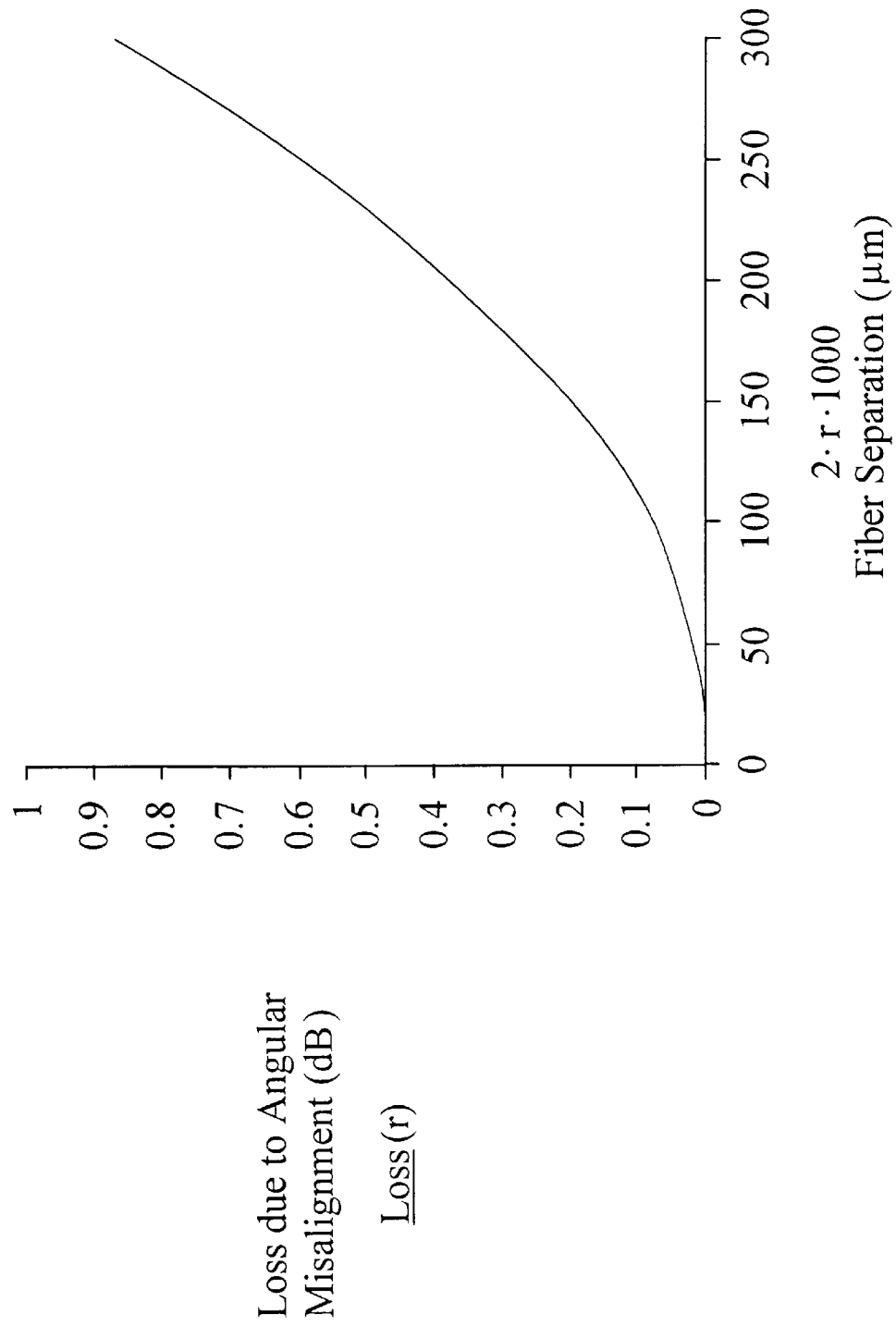

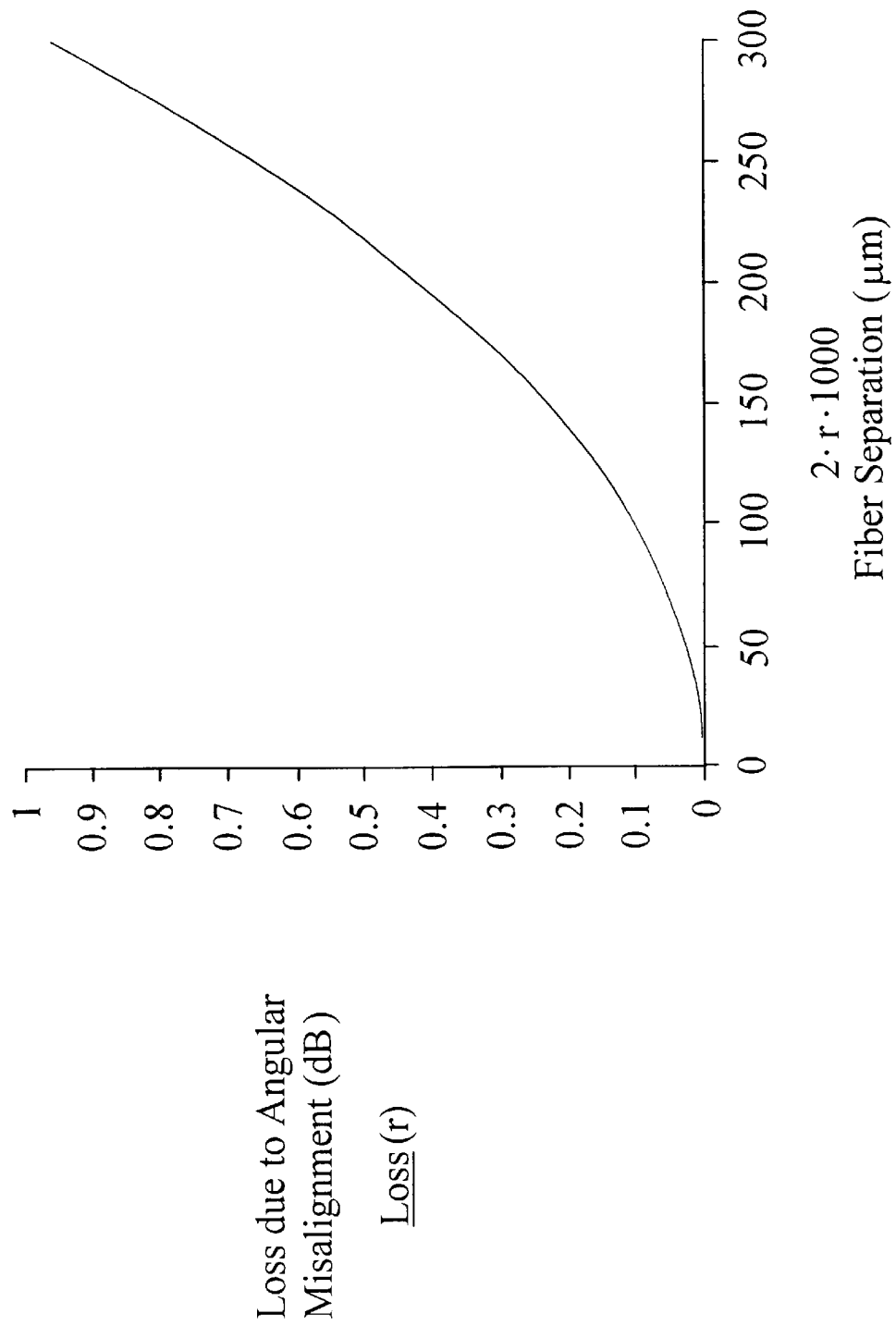

LENSED CASCADED OPTICAL FILTER

FIELD OF THE INVENTION

This invention relates generally to the coupling of light through lenses and more particularly to a device that provides multi-pass filtering through a plurality of cascaded optical filters.

BACKGROUND OF THE INVENTION

One of the more common constructions of optical wavelength division multiplexed (WDM) filters is a WDM filter element typically comprising a multi-layered thin film structure deposited on a transparent substrate, between two, substantially quarter-pitch graded index (GRIN) lenses. In some instances the thin film layers are coated to one of the end faces of the lens. Lenses of this type are produced under the trade name "SELFOC"; the mark is registered in Japan and owned by the Nippon Sheet and Glass Co. Ltd.

At a location along the lens, in this instance the end face, indicated as an approximately 0.25 pitch, the input beam becomes collimated. This phenomenon is further demonstrated in FIG. 1, where, two matched quarter pitch GRIN lenses are disposed in a back to back relationship. Each GRIN lens is provided with a port, which is a point or region along an end face of the lens for receiving or transmitting a beam of light.

Although these WDM filters perform their intended function, filters having a sharper, steeper more square response are at times required. This desired response can be achieved by passing a beam through multiple, similar, cascaded filters; or alternatively, and less preferred, by sandwiching two WDM filter elements together. The latter solution is however difficult to manufacture and tends not to be a reliable design.

As of late, standards have evolved and have become adopted for optical systems having very narrow channel spacing in an attempt to increase bandwidth in an optical system limited by the number of available optical waveguides. For example, the International Telecommunications Union (ITU) has developed standards for 100 and 200 GHz spacing of channels, and in an attempt to conform with these standards there has been a greater requirement for narrow band optical filters that have low signal loss.

As these requirements upon optical filter makers become more demanding by having to make filters that have extremely narrow passband responses, the number of thin film layers or optical interfaces may increase. As a result, the optical thickness of the substrate and filter layers of these filters also increases and light passing therethrough is affected differently, than a beam passing through a thin optical interface. Hence, the coupling of light passing through a filter having a large optical thickness becomes more difficult.

It is therefore an object of this invention, to provide a device, which passes at least a wavelength channel of light through cascaded optical filters with little signal loss and minimal distortion of the filter wavelength as light is passed through the filter at an non-orthogonal angle with respect to the filter surface.

It is a further object of the invention to provide a novel, compact, optical device that substantially corrects for beam distortion due to passing a beam of light through an optical filter at an non-orthogonal angle with respect to the filter surface.

SUMMARY OF THE INVENTION

In accordance with the invention, there is provided, a multi-pass filtering system comprising:

first and second substantially similar optically aligned filters, the filters being aligned in such a manner as to allow a beam of light launched into the first filter to propagate therethrough and to subsequently enter the second filter in an unguided manner, said first and second filters each including: two substantially collimating graded index rod lenses, and, a filter element disposed therebetween, at least one of the two substantially collimating graded index rod lenses having a port disposed at an end face thereof for receiving or transmitting light, an optical axis of at least one of the lenses of first filter being substantially offset from the optical axis of at least one of the lenses of the second filter.

In accordance with the invention, there is further provided a multi-pass optical filtering system comprising:

a first optical filter, said filter comprising a pair of lenses each having an optical axis and having a first optical filtering element disposed therebetween, one of said lenses having an input fibre at an input port and another of said lenses having an output location for receiving a beam of light launched into the input port through said first filtering element, said first optical filter having a signal loss $1_1$ measurable at the output location through an optical fibre corresponding to a lateral offset of a beam transmitted through the first optical filter element due in part to the optical thickness of the first optical filter element and in part to the location of the input port;

a second optical filter, said second filter comprising a pair of lenses having a second optical filtering element disposed therebetween having an optical axis, one of said lenses having an input location and another of said lenses having an output port for receiving a beam of light launched into the input location through said second filtering element, said second filter having at the output port a measurable signal loss $1_2$ measured through an optical fibre at the output port corresponding to a lateral offset of the beam transmitted through the second filter element, due to in part the optical thickness of the second filtering element and in part to the location of the input location, wherein the input port of the first filter is optically aligned with the output port of the second filter, and wherein the first optical filter is in-line and directly optically coupled or in-line and optically coupled through a free space region with the second optical filter, and wherein the optical axis of at least one of the lenses of the first optical filter is parallel to and offset from the optical axis of at least one of the lenses of the second optical filter in such a manner as to effect a substantially smaller signal loss than $1_1+1_2$ for a beam propagating from the input port to the output port.

In accordance with the invention, there is further provided, a multi-pass filtering system comprising a pair of substantially identical cascaded in-line filters each comprising a pair of GRIN lenses having a filter element sandwiched therebetween, each filter having a longitudinal optical axis through the pair of GRIN lenses and intersecting the filter elements, the filters being arranged such that light propagating through the first filter from an input port offset from the optical axis of the first filter is transmitted directly from the first filter to a second filter of the pair to an output port at an end face thereof, the optical axes of the filters being substantially parallel and substantially offset, such that a straight line from input port to the output port crosses through the filter elements at their intersection of their longitudinal axes.

Advantageously, the invention provides two substantially identical lensed optical filters having their longitudinal optical axes substantially parallel and offset such that a location between the substantially identical lensed optical filters is a midpoint location between the filters through which a line from the input port from one lens of one filter to an output port of another lens of the other filter passes, the offset being such that when a beam of light is passed from the midpoint to the input port, a beam having identical characteristics experiences a same optical path length and refractive index variation as a beam directed from the midpoint to the output port.

In accordance with a another aspect of the invention multi-pass optical filtering system is provided comprising:

a first optical filter, said filter comprising a pair of lenses each having an optical axis and having a first optical filtering element disposed therebetween, one of said lenses having an input fibre at an input port and another of said lenses having an output location for receiving a beam of light launched into the input port through said first filtering element, said first optical filter having a signal propagation direction measurable at the output location corresponding to a lateral offset of a beam transmitted through the first optical filter element due in part to the optical thickness of the first optical filter element and in part to the location of the input port, said propagation direction being angled with respect to the optical axis of the filter;

a second optical filter, said second filter comprising a pair of lenses having a second optical filtering element disposed therebetween having an optical axis, one of said lenses having an input location and another of said lenses having an output port for receiving a beam of light launched into the input location through said second filtering element, said second filter having at the input location a propagation direction corresponding to the lateral offset of the beam transmitted through the second filter element, due to in part the optical thickness of the second filtering element and in part to the location of the input location, wherein the input port of the first filter is optically aligned with the output port of the second filter, and wherein the first optical filter is in-line and directly optically coupled or in-line and optically coupled through a free space region with the second optical filter, and wherein the optical axis of at least one of the lenses of the first optical filter is parallel to and offset from the optical axis of at least one of the lenses of the second optical filter in such a manner as to substantially match the propagation direction and location of light exiting the first filter with the propagation direction and location of the light entering the second filter, thus minimizing the throughput loss through the two optical filters.

BRIEF DESCRIPTION OF THE DRAWINGS

Exemplary embodiments of the invention will now be described in conjunction with the drawings in which:

FIG. 3a is a graph of the output response of the filter shown in FIG. 3;

FIG. 5 is a side view of an arrangement of a pair of back to back spaced GRIN lenses having input/output waveguides positioned offset from the optical axes of the lenses;

FIG. 6 is side views of a substantially thick optical filter element sandwiched between two GRIN lenses;

FIG. 7 is a side view of two cascaded filters having their optical axes offset in accordance with an embodiment of this invention;

FIG. 9 is a graph depicting loss due to angular misalignment versus the separation of optical fibres for an optical filter having a single filter, such as one of the filters shown in FIG. 6 for a typical 200 GHz system; and, FIG. 10 is a graph depicting loss due to angular misalignment versus the separation of optical fibres at the input end face of the filter for the arrangement shown in FIG. 3b.

DETAILED DESCRIPTION

Figure 1:
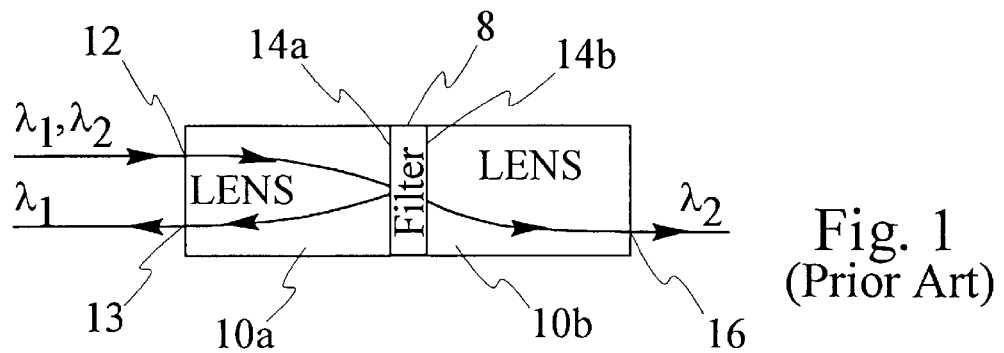
FIG. 1 is a prior art block diagram of a WDM filter using two quarter pitch GRIN lenses.

In the following description, it should be understood that same elements shown in different figures are assigned same reference numerals. Referring now to FIG. 1, a pair of quarter pitch GRIN lenses 10a and 10b are shown having a dichroic filter 8 designed to reflect light of wavelength $\lambda 1$ and to pass light of wavelength $\lambda 2$, sandwiched between collimating end faces 14a and 14b of the lenses. An input port 12 and an output port 13 are provided at a focusing end face of the lens 10a; the lens 10b has an output port 16 at its focusing end face that is optically aligned with the input port 12. The meaning of the word "port" in the specification is understood to be a location at an end face of a GRIN lens where light is launched into the lens or received from the lens.

Common dichroic filter elements typically comprise a pair of quarter pitch graded index (GRIN) lenses, either having one of their inside end faces coated with filter comprising a plurality of thin film layers, or have a transparent substrate, coated with thin film layers, disposed between the inwardly facing end faces of the pair of GRIN lenses.

When a composite beam of light including wavelengths $\lambda 1$ and $\lambda 2$ is launched into the input port 12, light of wavelength $\lambda 1$ is reflected from the filter 8 in a backwards direction to output port 13 of the GRIN lens 10a. Light of wavelength $\lambda 2$ is transmitted through the filter 8 and is directed to the output port 16 of the lens 10b.

Figure 2:
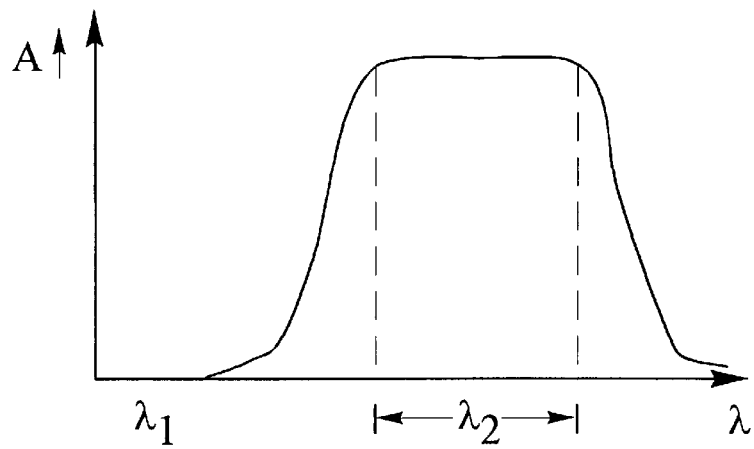
FIG. 2 is a graph of the output response of the filter shown in FIG. 1.
Figure 3:
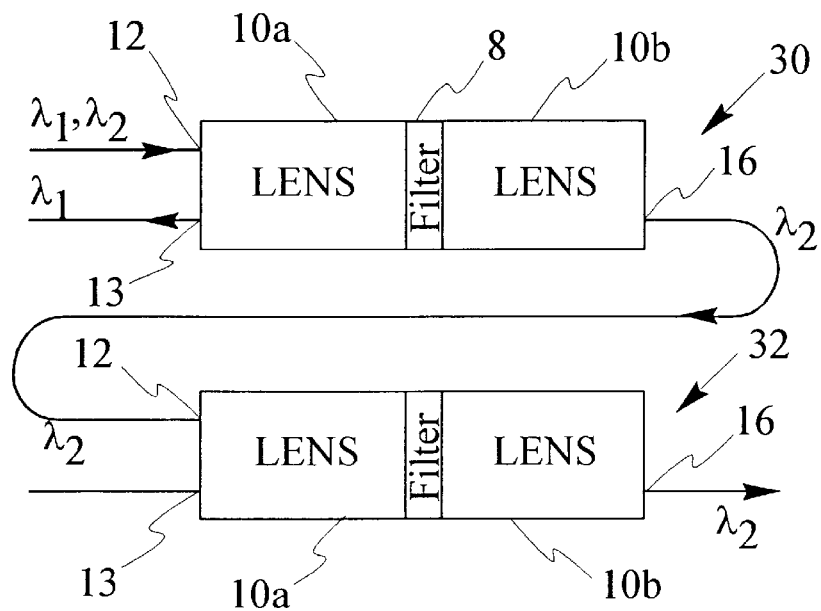
FIG. 3 is a prior art block diagram of a pair of WDM filters cascaded to provide twice filtering of the input signal of wavelength $\lambda 2$.

Referring now to FIG. 2, a graph is shown of a wavelength versus amplitude transmission response for the filter 8 of FIG. 1. One method of improving the slope of the response of the filter in FIG. 1, is to repeat filtering the output light at the output port 16, a second time, thereby producing an output response as is shown in FIG. 3a which is considerably steeper. This is accomplished by passing the signal at 16 through a same filter again, and this is shown in FIG. 3. Output 16 of the first filter 30 is connected to input port 12 of the second filter 32 using conventional coupling means such as an optical fiber tube (not shown) to couple optical fiber to the GRIN lens. Another configuration of a cascaded optical filter is shown in FIG. 3b, however as it will be explained later, this device suffers from unwanted effects that are corrected by this invention. Hence, although these cascaded devices perform their intended function, the associated coupling losses with a conventional cascaded filter designs can be significant.

Figure 4A:
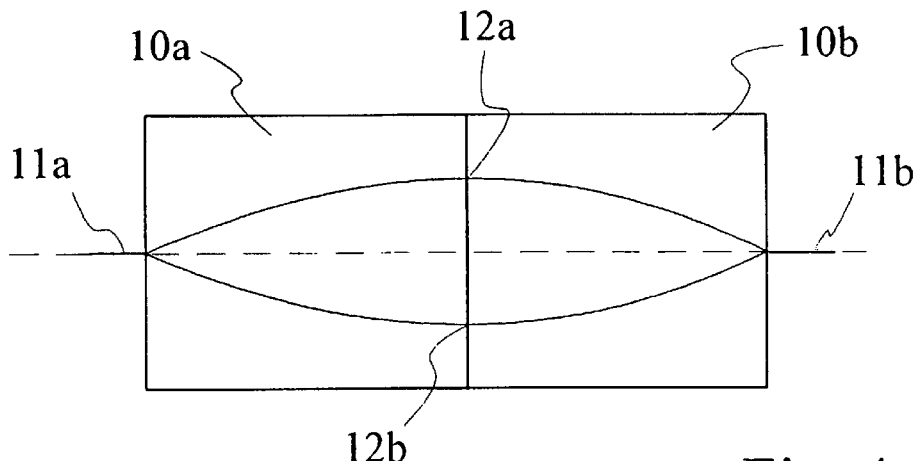
FIG. 4a is a side view of a prior art arrangement of a pair of back to back quarter pitch GRIN lenses having input/output waveguides positioned along the optical axes of the lenses.

Turning now to FIG. 4a, a pair of quarter pitch GRIN lenses 10a and 10b are shown having their collimating ends inwardly facing and their focusing ends outwardly facing. Two optical waveguides 11a and 11b are shown coaxial with and coupled to the lenses along the optical axis of the lenses 10a and 10b shown by a dotted line. A beam profile is also shown within the lenses 10a and 10b as if light was launched from one of the waveguides 11a and 11b to a respective lens. It should be noted that the beam profile at the interface between the two lenses extends to a circumference about the lens indicated by points 12a and 12b, being two points on the circumference.

Figure 4B:
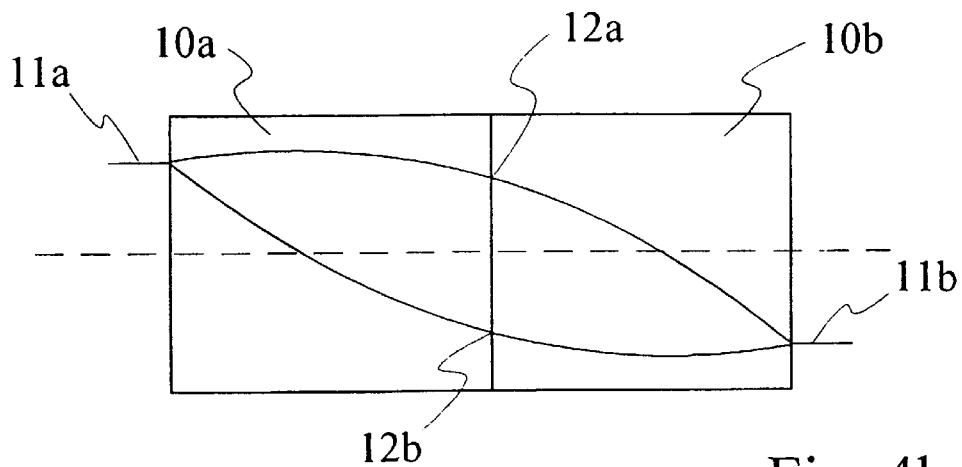
FIG. 4b is a side view of a prior art arrangement of a pair of back to back quarter pitch GRIN lenses having input/output waveguides positioned offset from the optical axes of the lenses.

FIG. 4b illustrates the same pair of GRIN lenses as in FIG. 4a, however the two optical waveguides 11a and 11b are shown to be offset a same optical distance above and below from the common optical axis of the lenses 10a and 10b. Here, the beam profile at the interface between the two lenses extends to the same circumference as in FIG. 4a, however the angle of the beam has varied. By ensuring that there is no separation between the two lenses, and that the optical waveguides are directly coupled with respective lenses, light is most effectively coupled from one waveguide 11a into the other 11b (or vice versa) when the waveguides are parallel to the common optical axis shared by the lenses. A similar arrangement is shown in FIG. 4c, wherein input/output waveguides 11a and 11b are disposed on opposite sides of the optical axis of the lens, from that in FIG. 4b.

Figure 4C:
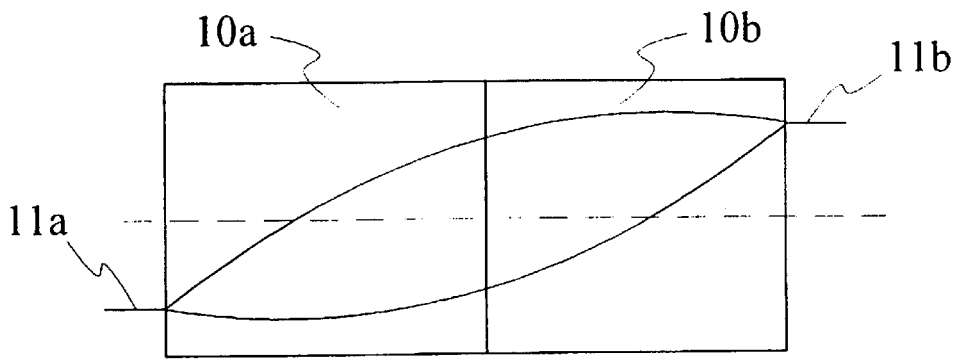
FIG. 4c is a side view of a prior art arrangement of a pair of back to back quarter pitch GRIN lenses having input/output waveguides positioned offset from the optical axes of the lenses.

Referring now to FIG. 5, the lenses shown in FIG. 4c are now spaced apart a fixed distance. The optical axis of the waveguide 11a is shown to be parallel to the optical axis OA of the lens 10a. However, in order to efficiently couple light from the output waveguide 11b, it must be non-parallel to the input waveguide 11a and at an angle $\theta$ with respect to the optical axis of the lens 10b, dependent upon the amount of separation. Essentially as the separation increases between the two lenses, the output beam diverges from the optical axis of lens 10b.

This phenomenon also occurs and becomes deleterious to the coupling of light in the structure shown in FIG. 3b. To more readily appreciate this problem, FIG. 6 illustrates an optical filter wherein the optical filter element 60 between a pair of GRIN lenses 10a and 10b is relatively thick. It should however also be understood that the optical thickness of a filter may be substantially greater than the physical thickness. In both cases, considerable physical thickness or optical thickness will result in a same problem.

Turning now to FIG. 6 an optical filter arrangement similar to that shown in FIG. 1 however, in FIG. 6 the narrow band filter 60 has an optical thickness that is considerably greater than that of the wide band filter 8 shown in FIG. 1. Here, it can be seen that the output signal having a wavelength $\lambda 1$ does not exit along the straight through path shown by the dotted line 62 but exits at a plurality of angles $\theta^-$, $\theta$, $\theta^+$ to the line 62 due to a wavelength dependent offset that exists as the beam exits the filter 60. This plurality of divergences from the dotted line 62 is due to the sub-beams entering the lens 10b slightly offset (smeared) from each other and off centre from the optical axis OA shown as a dotted line through the lenses. It is noted that the beam exiting the lens 10a, the outline of which is indicated by 61b and 61a, is centred about the optical axis OA. Due to the thickness of the filter 60, the central axis of the beam indicated by 63a and 63b and indicative of the wavelength $\lambda 1$ is eccentric with the optical axis OA. Thus the beam entering the lens 10b of wavelength $\lambda 1$ having its centre offset from the line OA exits at an angle $\theta^-$, $\theta$, $\theta^+$ to the line 62. Furthermore, due to the optical thickness of the filter 60 an unwanted shifting of the beam occurs according to wavelength into slight offset beams resulting in smearing that greatly adversely effects the coupling of the optical signal from the filter arrangement shown. This invention provides a means of effectively undoing this unwanted smearing in a forward direction as if the same distorted light rays exiting at angles $\theta^-$, $\theta$, $\theta^+$ to the line 62 were launched in a reverse direction along the paths from which they were each transmitted; however advantageously, this invention further provides the benefit of twice filtering the light achieving the overall desired result with optimum coupling.

Figure 8:
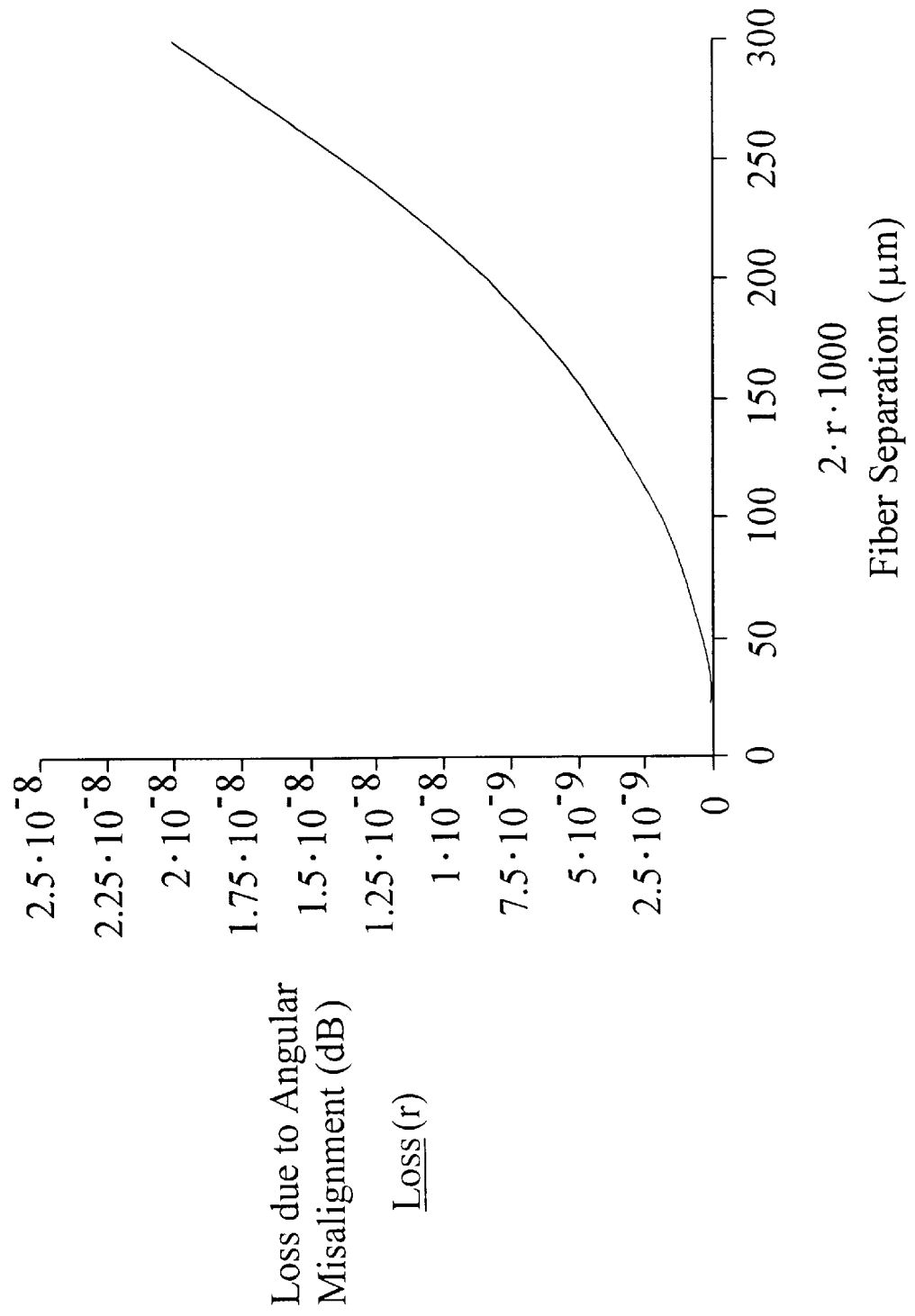
FIG. 8 is a graph depicting loss due to angular misalignment versus the separation of optical fibres at the input end face of the filter for the arrangement shown in FIG. 7.

A preferred embodiment of the invention is shown in FIG. 7, wherein two in-line cascaded optical filters 70a and 70b have their respective optical axes 73a and 73b parallel and offset by a distance approximately equal to twice the offset of the input beam from the optical axis of the filter 70a so that a beam or a ray of light launched into the port 12 of the filter 70a intersects the filter element 8 at the optical axis 73a and further subsequently couples into the filter 70b and intersects the filter element 8 at the optical axis 73b. The term in-line in this specification refers to a pair of filters being disposed such that one filter which is positioned to receive light from another filter without the use of optical waveguides such as optical fibres for guiding the light from one filter lens to another. The filters 70a and 70b are spaced and in-line such that the light exiting the filter 70a propagates unguided through a free space region into the filter 70b. Of course the free space region may have within it an index matching material for improving the coupling of light from one lens end face to the other. Or alternatively, the free space region may be a solid material having an index substantially the same as the index of the GRIN lens about where the beam exits. By providing cascaded offset filters in this manner, the unwanted effects of smearing and exit angle divergence are reversed and substantially undone in such a manner as to provide superior coupling of light from the input to the output of the device. Quite surprisingly, the signal loss due to angular misalignment for the two filters 70a and 70b is substantially less than the signal loss due to angular misalignment from a single stage optical filter. This is exemplified in the graphs of FIG. 8, FIG. 9 and FIG. 10 for a typical 200 GHz filter where the loss due to angular misalignment in dBs is plotted against the optical fibre separation in $\mu$m. In FIG. 9 the loss due to angular misalignment for a single filter is 0.9 dB for a fibre separation of 300 $\mu$m and in FIG. 10 the angular misalignment for two cascaded in-line filters as shown in FIG. 3b that are not offset is substantially the same, approximately 0.9 dB for a fibre separation of 300 $\mu$m. In contrast, the optical arrangement of FIG. 7 has a response shown in FIG. 8 wherein the loss due to angular misalignment for a fibre separation of 300 $\mu$m is $2*10^{-8}$ dB.

In summary, this invention achieves enhanced optical coupling and filtering of light by twice filtering a beam and by passing that beam into a port of a first filter at a first predetermined location at the input end face of a GRIN lens of the filter and by arranging a second substantially same second filter to be offset from the first filter such that the same beam exiting the first filter at an incline to the optical axis of the filter enters into a port of the second filter at a same predetermined location at the input end face of the GRIN lens of the second filter. Furthermore, in addition to providing enhanced coupling of light, this invention allows for the utilization of two inexpensive cascaded wider band filters to achieve narrower band filtering of an optical signal passing therethrough.

Numerous other embodiments may be envisaged without departing from the spirit and scope of the invention.

What is claimed is:

1. A multi-pass filtering system comprising:
   first and second substantially similar optically aligned filters, the filters being aligned in such a manner as to allow a beam of light launched into the first filter to propagate therethrough and to subsequently enter the second filter in an unguided manner, said first and second filters each including:
   two substantially collimating graded index rod lenses, and, a filter element disposed therebetween, at least one of the two substantially collimating graded index rod lenses having a port disposed at an end face thereof for receiving or transmitting light, an optical axis of at least one of the lenses of first filter being substantially offset from the optical axis of at least one of the lenses of the second filter.

2. A multi-pass filtering system as defined in claim 1 wherein the offset of the optical axes of the lenses of the first and second filters are such that a beam of light launched into the first filter propagates therethrough and enters the second filter after propagating through an unguided free space region.

3. A multi-pass filtering system as defined in claim 2, wherein the first and second filters have offset optical axes that are substantially parallel, and wherein the offset is substantially less than a diameter of the graded index rod lenses.

4. A multi-pass filtering system as defined in claim 1, wherein the optical axes are offset sufficiently to substantially correct for angular deviation of a beam of light exiting the first filter due to the optical thickness of the filter, and wherein the first and second filters are substantially in-line.

5. A multi-pass optical filtering system comprising:
   a first optical filter, said filter comprising a pair of lenses each having an optical axis and having a first optical filtering element disposed therebetween, one of said lenses having an input fibre at an input port and another of said lenses having an output location for receiving a beam of light launched into the input port through said first filtering element, said first optical filter having a signal loss $1_1$ measurable at the output location through an optical fibre corresponding to a lateral offset of a beam transmitted through the first optical filter element due in part to the optical thickness of the first optical filter element and in part to the location of the input port;
   a second optical filter, said second filter comprising a pair of lenses each having an optical axis, the second optical filter having a second optical filtering element disposed therebetween, one of said lenses having an input location and another of said lenses having an output port for receiving a beam of light launched into the input location through said second filtering element, said second filter having at the output port a measurable signal loss $1_2$ measured through an optical fibre at the output port corresponding to a lateral offset of the beam transmitted through the second filter element, due to in part the optical thickness of the second filtering element and in part to the location of the input location,
   wherein the input port of the first filter is optically aligned with the output port of the second filter, and wherein the first optical filter is in-line and directly optically coupled or in-line and optically coupled through a free space region with the second optical filter, and wherein the optical axis of at least one of the lenses of the first optical filter is parallel to and offset from the optical axis of at least one of the lenses of the second optical filter in such a manner as to effect a substantially smaller signal loss than $1_1+1_2$ for a beam propagating from the input port to the output port.

6. A filtering system as defined in claim 5, wherein the lenses are substantially quarter pitch graded index lenses, and wherein the optical axes of the lenses of the first optical filter are parallel to and offset from the optical axes of the lenses of the second optical filter in such a manner as to effect a substantially smaller signal loss than either $1_1$ or $1_2$ for a beam propagating from the input pot to the output port.

7. A filtering system as defined in claim 5, wherein the first optical filter is substantially the same as the second optical filter.

8. A filtering system as defined in claim 7, wherein the first and second optical filtering elements each comprise a multilayered thin film optical filter.

9. A multi-pass filtering system comprising a pair of substantially identical cascaded in-line filters each comprising a pair of GRIN lenses having a filter element sandwiched therebetween, each filter having a longitudinal optical axis through the pair of GRIN lenses and intersecting the filter elements, the filters being arranged such that light propagating through the first filter from an input port offset from the optical axis of the first filter is transmitted directly from the first filter to a second filter of the pair to an output port at an end face thereof, the optical axes of the filters being substantially parallel and substantially offset, such that a straight line from input port to the output port crosses through the filter elements at their intersection of their longitudinal axes.

10. A filtering system as defined in claim 9 wherein each filter element has a substantially identical output response that varies with the angle at which a beam is launched at the filter element.

11. A filtering system as defined in claim 10, wherein a beam launched into a port of the first filter intersects both the first filter element and the second filter element at a same non-zero angle to the optical axis of each filter.

12. Two substantially identical lensed optical filters having their longitudinal optical axes substantially parallel and offset such that a location between the substantially identical lensed optical filters is a midpoint location between the filters through which a line from the input port from one lens of one filter to an output port of another lens of the other filter passes, the offset being such that when a beam of light is passed from the midpoint to the input port, a beam having identical characteristics experiences a same optical path length and refractive index variation as a beam directed from the midpoint to the output port.

13. Two substantially identical lensed optical filters as defined in claim 12, wherein the lenses are GRIN lenses and where each filter comprises a substantially identical filter element disposed between a pair of back to back collimating GRIN lenses.

14. A multi-pass optical filtering system comprising:
   a first optical filter, said filter comprising a pair of lenses each having an optical axis and having a first optical filtering element disposed therebetween, one of said lenses having an input fibre at an input port and another of said lenses having an output location for receiving a beam of light launched into the input port through said first filtering element, said first optical filter having a signal propagation direction measurable at the output location corresponding to a lateral offset of a beam transmitted through the first optical filter element due in part to the optical thickness of the first optical filter element and in part to the location of the input port, said propagation direction being angled with respect to the optical axis of the filter;

a second optical filter, said second filter comprising a pair of lenses having a second optical filtering element disposed therebetween having an optical axis, one of said lenses having an input location and another of said lenses having an output port for receiving a beam of light launched into the input location through said second filtering element, said second filter having at the input location a propagation direction corresponding to the lateral offset of the beam transmitted through the second filter element, due to in part the optical thickness of the second filtering element and in part to the location of the input location, wherein the input port of the first filter is optically aligned with the output port of the second filter, and wherein the first optical filter is in-line and directly optically coupled or in-line and optically coupled through a free space region with the second optical filter, and wherein the optical axis of at least one of the lenses of the first optical filter is parallel to and offset from the optical axis of at least one of the lenses of the second optical filter in such a manner as to substantially match the propagation direction and location of light exiting the first filter with the propagation direction and location of the light entering the second filter, thus minimizing the throughput loss through the two optical filters.

* * * * *

UNITED STATES PATENT AND TRADEMARK OFFICE
CERTIFICATE OF CORRECTION

PATENT NO. : 6,055,112
DATED : April 25, 2000
INVENTOR(S) : Margot Campbell-Miller, et al.

It is certified that error appears in the above-identified patent and that said Letters Patent is hereby corrected as shown below:

Column 3, line 63, after "FIG. 3;" insert --FIG. 3b is a diagram of a prior art cascaded optical filter;--.

Signed and Sealed this

Eleventh Day of July, 2000

Attest:

Q. TODD DICKINSON

*Attesting Officer*          *Director of Patents and Trademarks*